US012664136B1

(12) United States Patent
Bose et al.

(10) Patent No.: US 12,664,136 B1
(45) Date of Patent: Jun. 23, 2026

(54) MACHINE LEARNING BASED SYSTEM AND METHOD FOR AUTOMATICALLY EXTRACTING AND CORRECTING FINANCIAL INFORMATION FROM DOCUMENTS

(71) Applicant: HIGHRADIUS CORPORATION, Houston, TX (US)

(72) Inventors: Debanwesh Bose, Hyderabad (IN); Vipul Jain, Hyderabad (IN); Lohit Vankina, Hyderabad (IN); Sumit Gupta, Hyderabad (IN); Pratyush Amrit, Hyderabad (IN); Narendar Reddy Kancherla, Hyderabad (IN); Hashwanth Maripina, Hyderabad (IN); Aishwarya Kumar, Hyderabad (IN)

(73) Assignee: HIGHRADIUS CORPORATION, TX (US)

( * ) Notice: Subject to any disclaimer, the term of this patent is extended or adjusted under 35 U.S.C. 154(b) by 0 days.

(21) Appl. No.: 18/986,941

(22) Filed: Dec. 19, 2024

(51) Int. Cl.
| | |
|---|---|
| *G06F 16/215* | (2019.01) |
| *G06F 16/28* | (2019.01) |
| *G06N 20/00* | (2019.01) |

(52) U.S. Cl.
CPC .......... *G06F 16/215* (2019.01); *G06F 16/285* (2019.01); *G06N 20/00* (2019.01)

(58) Field of Classification Search
CPC ...... G06F 16/215; G06F 16/285; G06N 20/00
See application file for complete search history.

(56) References Cited

U.S. PATENT DOCUMENTS

| | | | | |
|---|---|---|---|---|
| 2017/0228386 | A1* | 8/2017 | Cantley | G06V 30/416 |
| 2021/0280320 | A1* | 9/2021 | Arora | G16H 15/00 |
| 2023/0153918 | A1* | 5/2023 | Saxena | G06N 5/04 |
| | | | | 705/30 |
| 2023/0334244 | A1* | 10/2023 | Tensmeyer | G06N 3/09 |
| 2023/0409293 | A1* | 12/2023 | Batygin | G06N 3/08 |
| 2024/0404705 | A1* | 12/2024 | Petricoin, III | G16H 50/20 |
| 2025/0005440 | A1* | 1/2025 | Ren | G06N 20/00 |
| 2025/0315555 | A1* | 10/2025 | Huang | G06F 16/353 |

* cited by examiner

*Primary Examiner* — Maher N Algibhah

(74) *Attorney, Agent, or Firm* — Jason C. Cameron

(57) ABSTRACT

A machine learning based (ML-based) method and system for automatically extracting and correcting financial information from documents, is disclosed. Initially, the documents are obtained from data sources and pre-processed to generate the pre-processed data associated with contents within the document. The contents are classified as potential key-value pairs corresponding to the financial information based on the system prompts and extracted using the ML model. The potential key-value pairs are corrected to obtain the corrected key-value pairs based on custom prompts, using the ML model. The corrected key-value pairs corresponding to the financial information are provided as the output to the end users on user interfaces associated with an electronic device. This technique extracts financial information regardless of structure or alignment by learning to recognize any added or removed prefixes or suffixes, enabling the prefixes or suffixes to make corrections and generate accurate key-value pairs.

17 Claims, 7 Drawing Sheets

100

104

300

400

402

| Payee: ABCD | | TIN/SSN: 12345 | | | | | Check Number: 54321 | | |
| --- | --- | --- | --- | --- | --- | --- | --- | --- | --- |
| Check Amount: 376.20 | | | | | | Check Date: 01/01/2020 | | | |
| Claim Number | Employer | Claimant Name | Loss Date | Payment Transaction | From | Through | Invoice Date | Invoice # | Amount |
| ACCT-12 | XYZ | DEF | 9/20/2019 | Nurse Case Management | | | | CM5678-00 | 376.20 |

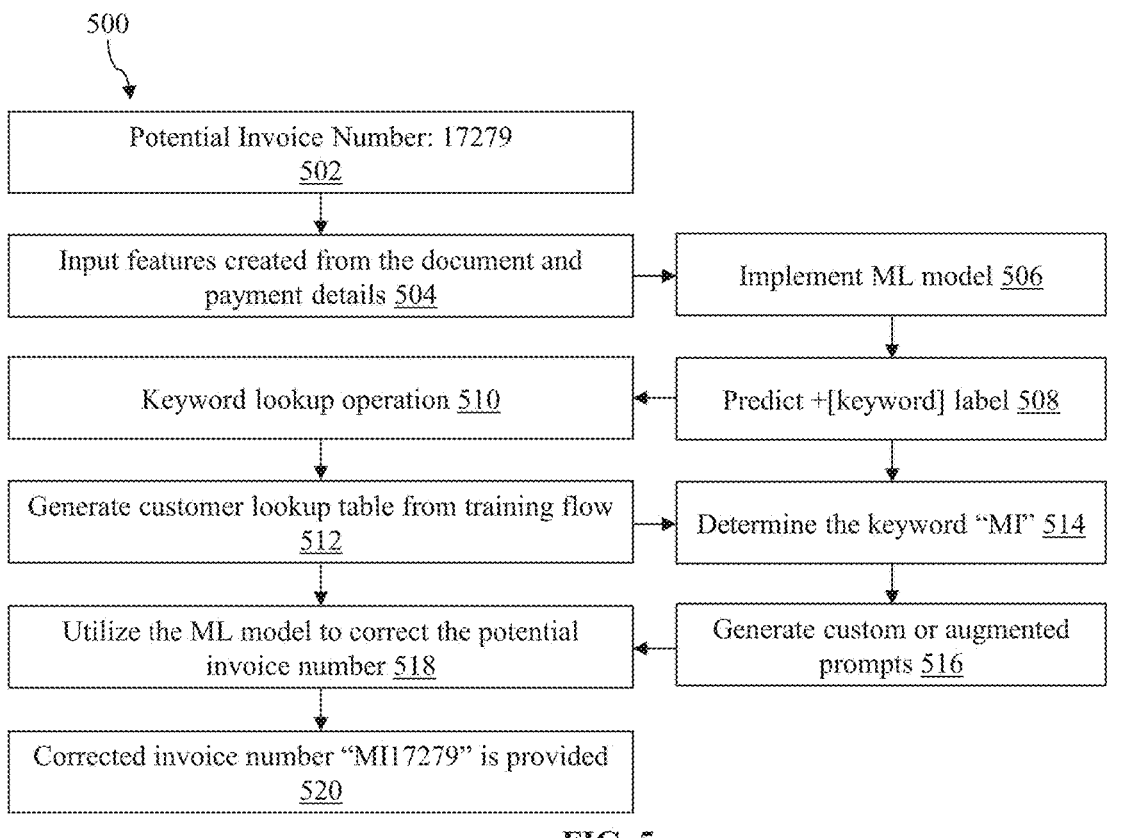

500

Potential Invoice Number: 17279
502

Input features created from the document and payment details 504

Implement ML model 506

Keyword lookup operation 510

Predict +[keyword] label 508

Generate customer lookup table from training flow 512

Determine the keyword "MI" 514

Utilize the ML model to correct the potential invoice number 518

Generate custom or augmented prompts 516

Corrected invoice number "MI17279" is provided 520

| Payment date | Method | Currency | Amount | Assignment (Invoice #) | Reference Date | Check No. | Check enhancement date | Etc. | Profit Center |
|---|---|---|---|---|---|---|---|---|---|
| 20231027 | ACH | CAD | 3840.88 | MI17279 | 20230930 | | | | |
| Invoice Total Amount | CAD | | | | | | | | |

Historical user action data 702

Keyword lookup table generated from user action training data 704

Input features created based on the document and payment details 706

Data labelled and encoded based on [keyword] prefix/suffix addition/subtraction 708

ML model training 710

Hyperparameter tuning with cross validation 712

Model metadata and metrics saved for inference 714

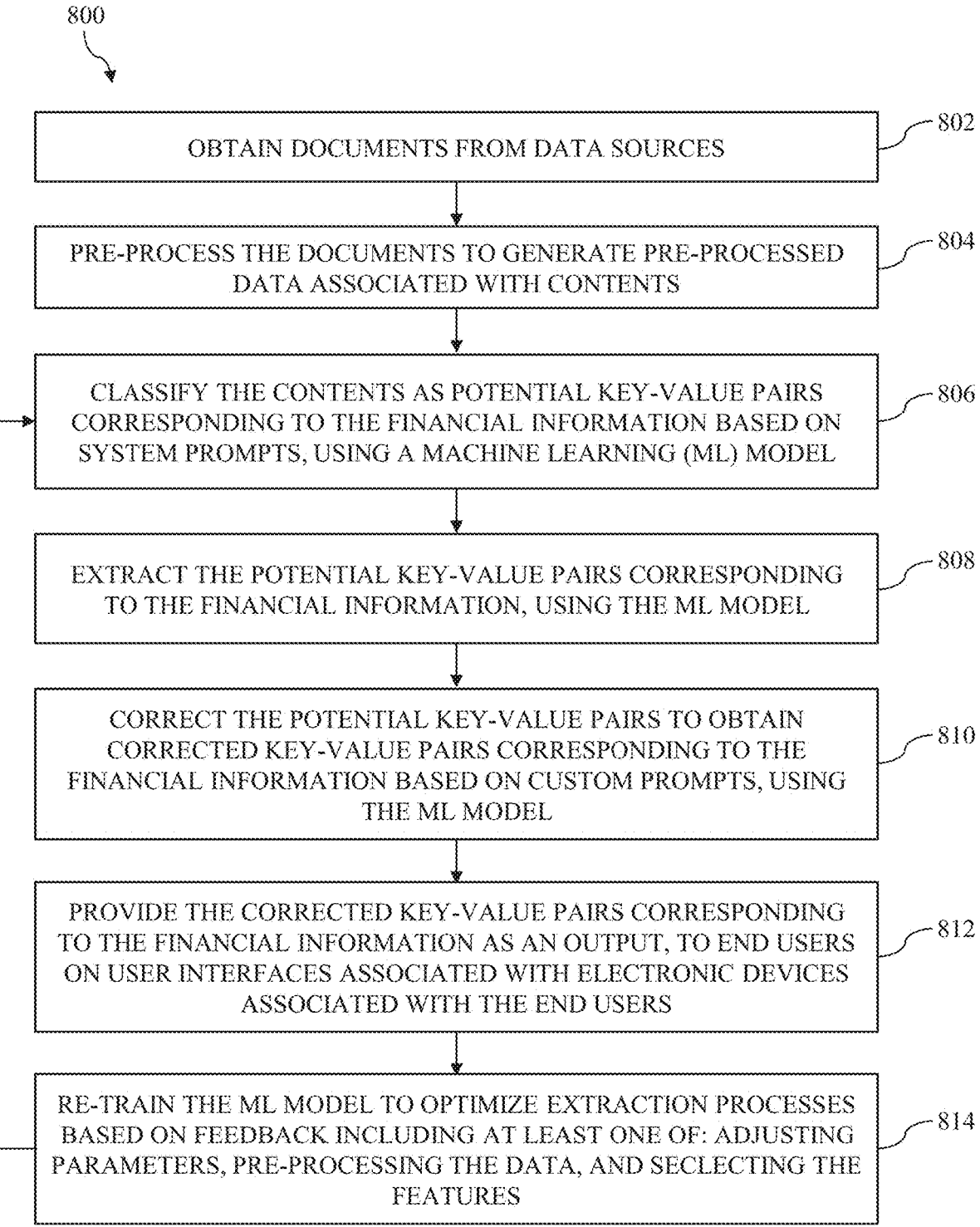

800

OBTAIN DOCUMENTS FROM DATA SOURCES — 802

PRE-PROCESS THE DOCUMENTS TO GENERATE PRE-PROCESSED DATA ASSOCIATED WITH CONTENTS — 804

CLASSIFY THE CONTENTS AS POTENTIAL KEY-VALUE PAIRS CORRESPONDING TO THE FINANCIAL INFORMATION BASED ON SYSTEM PROMPTS, USING A MACHINE LEARNING (ML) MODEL — 806

EXTRACT THE POTENTIAL KEY-VALUE PAIRS CORRESPONDING TO THE FINANCIAL INFORMATION, USING THE ML MODEL — 808

CORRECT THE POTENTIAL KEY-VALUE PAIRS TO OBTAIN CORRECTED KEY-VALUE PAIRS CORRESPONDING TO THE FINANCIAL INFORMATION BASED ON CUSTOM PROMPTS, USING THE ML MODEL — 810

PROVIDE THE CORRECTED KEY-VALUE PAIRS CORRESPONDING TO THE FINANCIAL INFORMATION AS AN OUTPUT, TO END USERS ON USER INTERFACES ASSOCIATED WITH ELECTRONIC DEVICES ASSOCIATED WITH THE END USERS — 812

RE-TRAIN THE ML MODEL TO OPTIMIZE EXTRACTION PROCESSES BASED ON FEEDBACK INCLUDING AT LEAST ONE OF: ADJUSTING PARAMETERS, PRE-PROCESSING THE DATA, AND SECLECTING THE FEATURES — 814

FIG. 8

MACHINE LEARNING BASED SYSTEM AND METHOD FOR AUTOMATICALLY EXTRACTING AND CORRECTING FINANCIAL INFORMATION FROM DOCUMENTS

FIELD OF INVENTION

Embodiments of the present disclosure relate to machine learning based (ML-based) systems, and more particularly relates to a ML-based method and system for automatically extracting and correcting one or more financial information from one or more documents.

BACKGROUND

In the finance industry, the capability to efficiently and accurately handle financial documents is crucial for businesses in various sectors. A key aspect of this process is extracting and mapping relevant data from remittance documents. This task is challenging because of the wide variety and formats of the remittance documents. The technical problem not only affects the efficiency of financial operations but also affects areas including at least one of: account reconciliation, customer service, regulatory compliance, and the like. Therefore, resolving this issue is vital for improving business processes and advancing document processing technologies.

Businesses need to capture information from different types of the remittance documents where multiple challenges are faced during information extraction. There are two broad categories of problems faced by rule-based information extraction systems as follows. The remittance documents are not structured or aligned in a typical format, where content lies in arbitrary positions without any defined structure. Sometimes, the information within remittance documents can be incorrect or inconsistent, deviating from the typical format. In such cases, to align with account receivable (AR) line items, an analyst using the payment service application may need to add or remove prefixes or suffixes from the invoice information. This process can be challenging for a rule-based system to learn or implement effectively.

Currently, the prevalent approach to address this issue involves utilization of extensive manual efforts alongside the use of rule-based computing systems for extraction of information from the remittance documents. In this traditional technique, the process begins by applying Optical Character Recognition (OCR) technology to convert the remittance document's text into a digital format. Subsequently, the extracted information is filtered through a manually defined set of rules, created by analysts, to identify and isolate the specific remittance information required for further processing.

However, the current solution is hampered by two major drawbacks. First, the remittance documents lack a standardized format, with crucial information often scattered arbitrarily across the document, devoid of any predictable structure. This variability creates a substantial challenge for rule-based systems, which rely on predetermined patterns for information identification and extraction. Second, the requirement for analysts to manually adjust the parameters of the rules, including addition or deletion of prefixes or suffixes to match specific remittance information introduces a level of complexity and inflexibility that is difficult to manage within a rule-based framework. These limitations not only hinder the processing speed but also affect accuracy and reliability of the information extraction, leading to potential errors and operational inefficiencies.

Hence, there is a need for an improved machine learning based (ML-based) system and method for automatically extracting and correcting one or more financial information from one or more documents, in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a machine-learning based (ML-based) method for automatically extracting and correcting one or more financial information from one or more documents, is disclosed. The ML-based method comprises obtaining, by one or more hardware processors, the one or more documents from one or more data sources.

The ML-based method further comprises pre-processing, by the one or more hardware processors, the one or more documents to generate pre-processed data associated with one or more contents.

The ML-based method further comprises classifying, by the one or more hardware processors, the one or more contents as one or more potential key-value pairs corresponding to the one or more financial information based on one or more system prompts, using a machine learning (ML) model.

The ML-based method further comprises extracting, by the one or more hardware processors, the one or more potential key-value pairs corresponding to the one or more financial information, using the ML model.

The ML-based method further comprises correcting, by the one or more hardware processors, the one or more potential key-value pairs to obtain one or more corrected key-value pairs corresponding to the one or more financial information based on one or more custom prompts, using the ML model.

The ML-based method further comprises providing, by the one or more hardware processors, the one or more corrected key-value pairs corresponding to the one or more financial information as an output, to one or more end users on one or more user interfaces associated with one or more electronic devices associated with the one or more end users.

In an embodiment, classifying the one or more contents as one or more potential key-value pairs corresponding to the one or more financial information based on one or more system prompts, using the ML model, comprises: (a) converting, by the one or more hardware processors, the pre-processed data into unstructured data having a single unstructured string based on at least one of lines, tabs, spaces within the one or more documents, to provide alignment information associated with the one or more documents to the ML model; and (b) generating, by the one or more hardware processors, the one or more system prompts to classify the unstructured data as one or more potential key-value pairs using Natural Language Processing (NLP) techniques, wherein the generation of the one or more system prompts includes one of: (i) performing, by the one or more hardware processors, alignment of the one or more documents based on the unstructured data using the ML model being pre-trained on a plurality of documents, to mitigate one or more alignment errors from the one or more documents; and (b) obtaining, by the one or more hardware processors, one or more localization information from one or more users, wherein the one or more system prompts utilize the one or more localization information for classifying the unstructured data as one or more potential key-value pairs.

In another embodiment, the ML-based method further comprises automatically generating, by the one or more hardware processors, the one or more custom prompts using an auto prompt generation engine (APGE) by: (a) obtaining, by the one or more hardware processors, historical data associated with one or more historical documents, wherein the historical data comprise at least one of: historical state end and file definition language (FDL) data for one or more entities present in the one or more historical documents; (b) determining, by the one or more hardware processors, one or more occurrences in the one or more historical documents to segregate the one or more historical documents, wherein the one or more occurrences comprise at least one of: one or more user edits comprising at addition and subtraction of at least one of: prefix and suffix, mis-capture of information in the one or more historical documents during Optical Character Recognition (OCR), and missing of information in the one or more historical documents; (c) generating, by the one or more hardware processors, the one or more custom prompts by identifying one or more patterns associated with the one or more occurrences in the one or more historical documents, wherein the one or more custom prompts enable the ML model to correct the one or more potential key-value pairs into the one or more corrected key-value pairs by performing the at least one of: the addition and the subtraction of the at least one of: the prefix and the suffix to at least one of: one or more potential keys and one or more potential values, within the one or more potential key-value pairs; and (d) storing, by the one or more hardware processors, the one or more custom prompts along with one or more generic prompts in one or more prompt repositories.

In yet another embodiment, the ML-based method further comprises training, by the one or more hardware processors, the ML model by: (a) obtaining, by the one or more hardware processors, the one or more custom prompts from the one or more prompt repositories, as the input at the ML model, to learn the one or more patterns associated with the one or more occurrences in the one or more historical documents; (b) encoding, by the one or more hardware processors, the one or more patterns associated with the one or more occurrences; (c) labelling, by the one or more hardware processors, the one or more patterns associated with the one or more occurrences, in one or more formats to obtain a labelled information; (d) encoding, by the one or more hardware processors, the labelled information by assigning each labelled information with one or more numeric values; and (e) storing, by the one or more hardware processors, the encoded labelled information, in a lookup table for training and inferencing by the ML model.

In yet another embodiment, the ML-based method further comprises training, by the one or more hardware processors, the ML model using one or more hyperparameters. The one or more hyperparameters comprise at least one of: n estimators indicating a number of trees in a forest model, optimum features indicating optimum number of features considered for splitting a node, optimum depth indicating optimum number of levels in each decision tree, minimum samples split indicating minimum number of data points placed in the node prior to split of the node, minimum samples leaf indicating minimum number of the data points allowed in a leaf node, and bootstrap indicating a method for sampling the data points. The one or more hyperparameters are automatically adjusted to determine one or more optimized hyperparameters in a subset value of each of the one or more hyperparameters.

In yet another embodiment, pre-processing the one or more documents comprises extracting, by the one or more hardware processors, data from the one or more electronic documents, using a document scraper model. The data comprise at least one of: one or more words, one or more phrases, one or more numbers, and one or more characters with metadata.

In yet another embodiment, pre-processing the one or more documents comprises grouping, by the one or more hardware processors, the data based on at least one of: parts of speech of at least one of: the one or more words and the one or more phrases, relationship between at least one of: the one or more words and the one or more phrases, and meaning of at least one of: the one or more words and the one or more phrases, using one or more custom rules.

In yet another embodiment, pre-processing the data associated with the one or more electronic documents further comprises at least one of: (a) replacing, by the one or more hardware processors, each character in the one or more contents with one or more corresponding Unicode string values, based on one or more custom noise removal rules; (b) removing, by the one or more hardware processors, one or more punctuations before the one or more phrases in the one or more contents, based on the one or more custom noise removal rules; and (c) removing, by the one or more hardware processors, one or more characters that are recurred, from the one or more contents, based on the one or more custom noise removal rules.

In yet another embodiment, the ML-based method further comprises: (a) assessing, by the one or more hardware processors, an accuracy of extracted one or more financial information by comparing the extracted one or more financial information with one or more reference financial information; (b) generating, by the one or more hardware processors, one or more evaluation reports providing one or more insights into the accuracy of the extracted one or more financial information; (c) automatically generating, by the one or more hardware processors, one or more feedback in at least one of: real-time and periodic, on the one or more evaluation reports to provide one or more suggestions on the extraction process; and (d) monitoring, by the one or more hardware processors, performance of the extraction process over time to determine one or more changes in accuracy metrics and error patterns.

In one aspect, a machine learning based (ML-based) system for automatically extracting and correcting one or more financial information from one or more documents, is disclosed. The ML-based system includes one or more hardware processors and a memory coupled to the one or more hardware processors. The memory includes a plurality of subsystems in the form of programmable instructions executable by the one or more hardware processors.

The plurality of subsystems comprises a document obtaining subsystem configured to obtain the one or more documents from one or more data sources.

The plurality of subsystems further comprises a document pre-processing subsystem configured to pre-process the one or more documents to generate pre-processed data associated with one or more contents.

The plurality of subsystems further comprises a content classifying subsystem configured to classify the one or more contents as one or more potential key-value pairs corresponding to the one or more financial information based on one or more system prompts, using a machine learning (ML) model.

The plurality of subsystems further comprises a key-value extracting subsystem configured to extract the one or more potential key-value pairs corresponding to the one or more financial information, using the ML model.

The plurality of subsystems further comprises a key-value correcting subsystem configured to correct the one or more potential key-value pairs to obtain one or more corrected key-value pairs corresponding to the one or more financial information based on one or more custom prompts, using the ML model.

The plurality of subsystems further comprises an output subsystem configured to provide the one or more corrected key-value pairs corresponding to the one or more financial information as an output, to one or more end users on one or more user interfaces associated with one or more electronic devices associated with the one or more end users.

In another aspect, a non-transitory computer-readable storage medium having instructions stored therein that, when executed by a hardware processor, causes the processor to perform method steps as described above.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which:

FIG. 5 is a process flow depicting extraction and correction of the one or more financial information from the one or more documents using an auto prompt generation engine (APGE), in accordance with another embodiment of the present disclosure;

FIG. 6 is an exemplary tabular view depicting extraction and correction of the one or more financial information from the one or more documents, such as those shown in FIG. 5;

FIG. 8 is a flow chart illustrating a machine-learning based (ML-based) method for automatically extracting and correcting the one or more financial information from the one or more documents, in accordance with an embodiment of the present disclosure;

Figure 1:
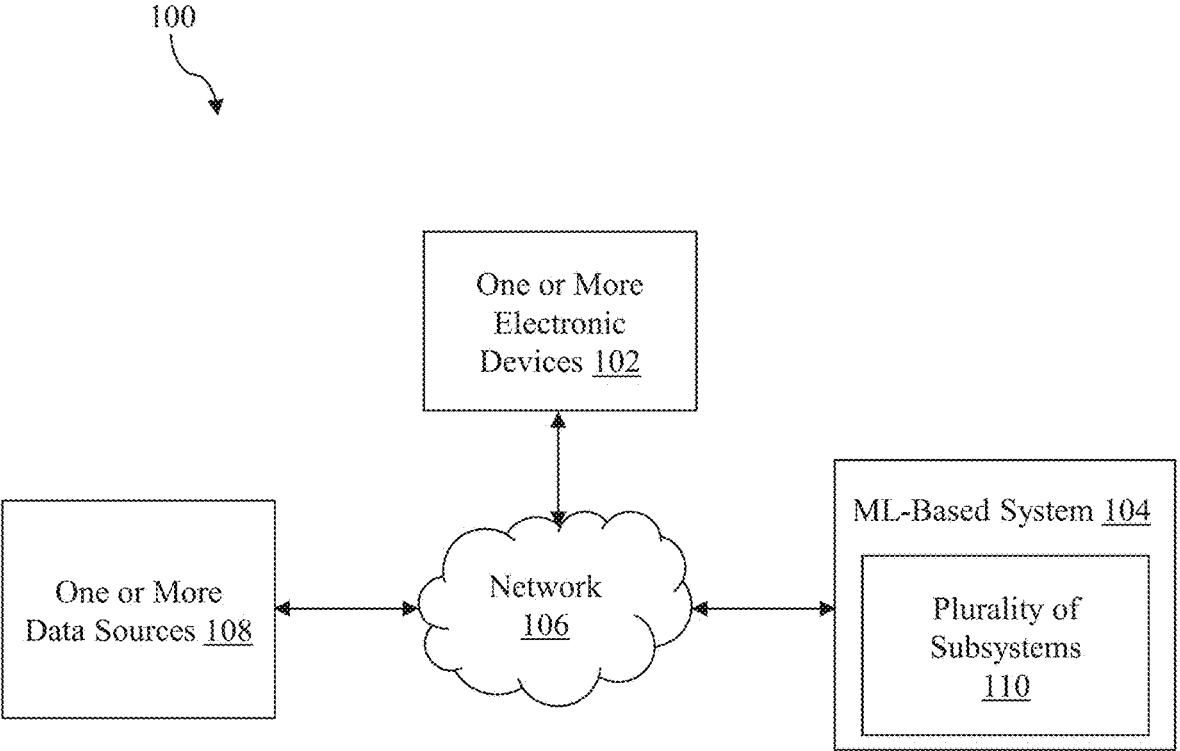
FIG. 1 is a block diagram illustrating a computing environment with a machine learning based (ML-based) system for automatically extracting and correcting one or more financial information from one or more documents, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module includes dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed, permanently configured (hardwired) or temporarily configured (programmed) to operate in a certain manner and/or to perform certain operations described herein.

Referring now to the drawings, and more particularly to FIG. 1 through FIG. 8, where similar reference characters denote corresponding features consistently throughout the figures, there are shown preferred embodiments and these embodiments are described in the context of the following exemplary system and/or method.

FIG. 1 is a block diagram illustrating a computing environment 100 with a machine learning based (ML-based) system 104 for automatically extracting and correcting one or more financial information from the one or more documents, in accordance with an embodiment of the present disclosure. In an embodiment, the terms one or more documents and one or more financial documents may be used interchangeably. In another embodiment, the one or more documents comprises at least one of: email remittance, Optical Character Recognition (OCR) remittance, payment notes, invoices, remittance advice, remittance documents, bank statements, payment vouchers, payroll documents, credit memos, purchase orders, expense reports, budgets, financial statements, and the like. According to FIG. 1, the computing environment 100 includes one or more electronic devices 102 that are communicatively coupled to the ML-based system 104 through a network 106. The one or more electronic devices 102 through which one or more end users receive output results from the ML-based system 104.

The present invention is configured to automatically extract and correct the one or more financial information from the one or more documents. The ML-based system 104 is initially configured to obtain the one or more documents from one or more data sources 108. In an embodiment, the one or more documents may be encrypted and decrypted by the ML-based system 104, so that one or more third party users cannot be authenticated to manipulate the one or more documents.

The ML-based system 104 is further configured to pre-process the one or more documents to generate pre-processed data associated with one or more contents. The ML-based system 104 is further configured to classify the one or more contents as one or more potential key-value pairs corresponding to the one or more financial information based on one or more system prompts, using a machine learning (ML) model. The ML-based system 104 is further configured to extract the one or more potential key-value pairs corresponding to the one or more financial information, using the ML model. In an embodiment, for example, the one or more financial documents may be an invoice identified as "INV-2023-001" with a payee's name recorded as "ZAQWSX Tech Solutions" and a payer's name as "XSDCFV Corp". The document's invoice date is set to "2023-10-01" with a due date of "2023-10-30" reflecting a total amount due of "$3,450.00" which includes a tax amount of "$345.00". The payment method is specified as "ACH Transfer" with a unique transaction identifier assigned as "TXN-987654". Furthermore, the item description lists "Web Development Services" alongside a quantity of "100" at a unit price of "$34.50" in the currency of "USD". The payment status is marked as "Pending". In this example, few exemplary key-value pairs may be:

Document Type: "Invoice"
Unique Identifier: "INV-2023-001"
Payee Name: "ZAQWSX Tech Solutions"
Payer Name: "XSDCFV Corp"
Invoice Date: "2023-10-01"
Due Date: "2023-10-30"
Total Amount: "$3,450.00"
Tax Amount: "$345.00"
Payment Method: "ACH Transfer"
Transaction Identifier: "TXN-123456"
Item Description: "Web Development Services"
and the like.

The ML-based system 104 is further configured to correct the one or more potential key-value pairs to obtain one or more corrected key-value pairs corresponding to the one or more financial information based on one or more custom prompts, using the ML model. The ML-based system 104 is further configured to provide the one or more corrected key-value pairs corresponding to the one or more financial information as an output, to the one or more end users on one or more user interfaces associated with the one or more electronic devices 102 associated with the one or more end users.

In an embodiment, the one or more end users may include at least one of: one or more data analysts, one or more business analysts, one or more cash analysts, one or more financial analysts, one or more collection analysts, one or more debt collectors, one or more professionals associated with cash and collection management, one or more customers, one or more organizations, one or more corporations, one or more parent companies, one or more subsidiaries, one or more joint ventures, one or more partnerships, one or more governmental bodies, one or more associations, and one or more legal entities, and the like.

The ML-based system 104 may be hosted on a central server including at least one of: a cloud server or a remote server. Further, the network 106 may be at least one of: a Wireless-Fidelity (Wi-Fi) connection, a hotspot connection, a Bluetooth connection, a local area network (LAN), a wide area network (WAN), any other wireless network, and the like. In an embodiment, the one or more electronic devices 102 may include at least one of: a laptop computer, a desktop computer, a tablet computer, a Smartphone, a wearable device, a Smart watch, and the like.

Further, the computing environment 100 includes the one or more data sources 108 communicatively coupled to the ML-based system 104 through the network 106. In an embodiment, the one or more data sources 108 may store the one or more documents. In an embodiment, the one or more data sources 108 includes at least one of: one or more relational databases, one or more object-oriented databases, one or more data warehouses, one or more cloud-based databases, and the like. In another embodiment, a format of the data obtained from the one or more documents may include at least one of: a comma-separated values (CSV) format, a JavaScript Object Notation (JSON) format, an Extensible Markup Language (XML), spreadsheets, and the like.

Furthermore, the one or more electronic devices 102 include at least one of: a local browser, a mobile application, and the like. Furthermore, the one or more end users may use a web application through the local browser, the mobile application to communicate with the ML-based system 104. In an embodiment of the present disclosure, the ML-based system 104 includes a plurality of subsystems 110. Details on the plurality of subsystems 110 have been elaborated in subsequent paragraphs of the present description with reference to FIG. 2.

Figure 2:
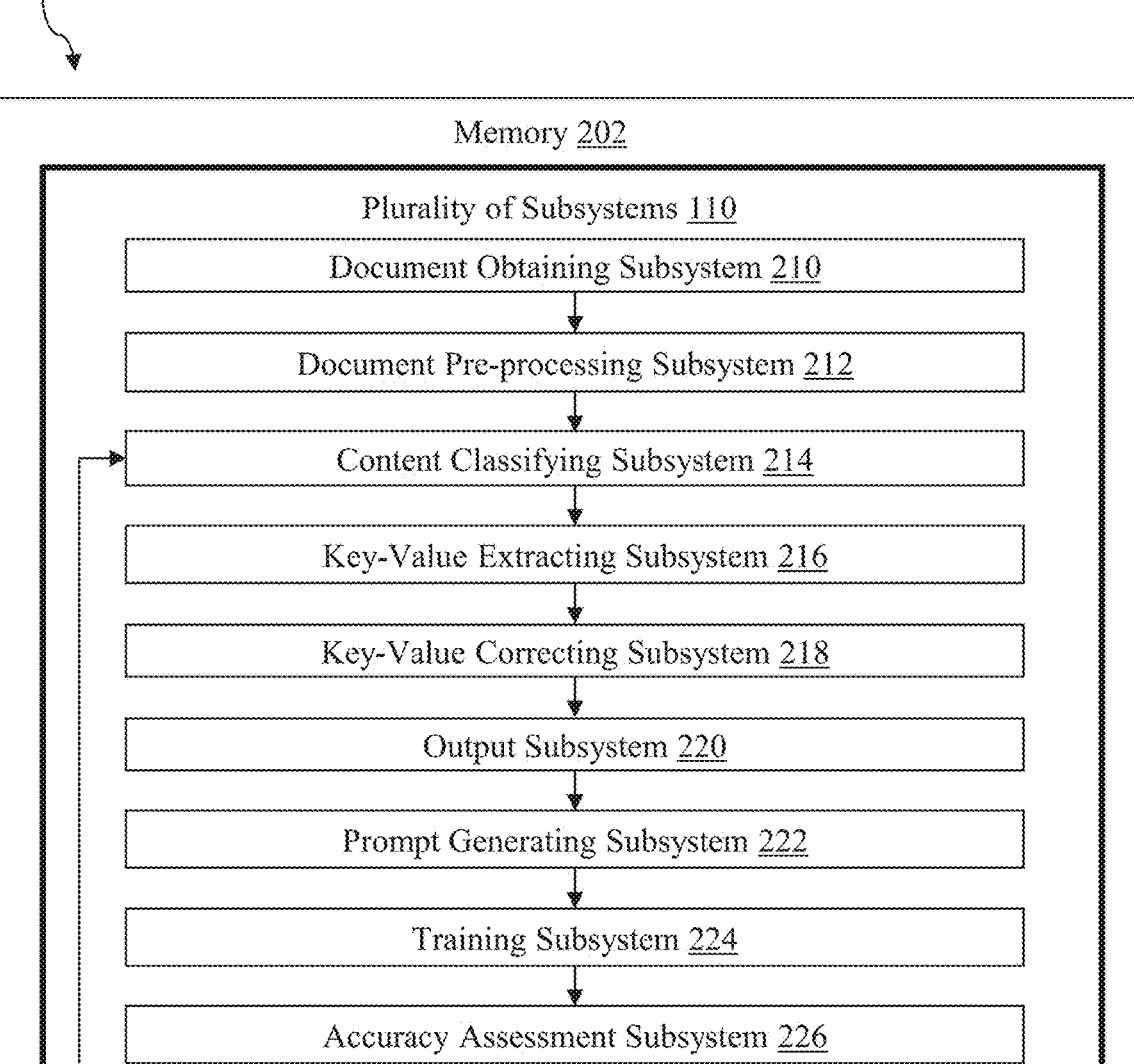
FIG. 2 is a detailed view of the ML-based system for automatically extracting and correcting the one or more financial information from the one or more documents, in accordance with another embodiment of the present disclosure.

FIG. 2 is a detailed view of the ML-based system 104 for automatically extracting and correcting the one or more financial information from the one or more documents, in accordance with another embodiment of the present disclosure. The ML-based system 104 includes a memory 202, one or more hardware processors 204, and a storage unit 206. The memory 202, the one or more hardware processors 204, and the storage unit 206 are communicatively coupled through a system bus 208 or any similar mechanism. The memory 202 includes the plurality of subsystems 110 in the form of programmable instructions executable by the one or more hardware processors 204.

The plurality of subsystems 110 includes a document obtaining subsystem 210, a document pre-processing subsystem 212, a content classifying subsystem 214, a key-value extracting subsystem 216, a key-value correcting subsystem 218, an output subsystem 220, a prompt generating subsystem 222, a training subsystem 224, and an accuracy assessment subsystem 226. The brief details of the plurality of subsystems 110 have been elaborated in a below table.

| Plurality of Subsystems 110 | Functionality |
|---|---|
| Document obtaining subsystem 210 | The document obtaining subsystem 210 is configured to obtain the one or more documents from the one or more data sources 108. |
| Document pre-processing subsystem 212 | The document pre-processing subsystem 212 is configured to pre-process the one or more documents to generate the pre-processed data associated with the one or more contents. |
| Content classifying subsystem 214 | The content classifying subsystem 214 is configured to classify the one or more contents as the one or more potential key-value pairs corresponding to the one or more financial information based on the one or more system prompts, using the ML model. |
| Key-value extracting subsystem 216 | The key-value extracting subsystem 216 is configured to extract the one or more potential key-value pairs corresponding to the one or more financial information, using the ML model. |
| Key-value correcting subsystem 218 | The key-value correcting subsystem 218 is configured to correct the one or more potential key-value pairs to obtain the one or more corrected key-value pairs corresponding to the one or more financial information based on the one or more custom prompts, using the ML model. |
| Output subsystem 220 | The output subsystem 220 is configured to provide the one or more corrected key-value pairs corresponding to the one or more financial information as the output, to the one or more end users on the one or more user interfaces associated with the one or more electronic devices 102 associated with the one or more end users. |
| Prompt generating subsystem 222 | The prompt generating subsystem 222 is configured to generate the one or more custom prompts using the auto prompt generation engine (APGE). |
| Training subsystem 224 | The training subsystem 224 is configured to train the ML model for generating the one or more custom prompts. |
| Accuracy assessment subsystem 226 | The accuracy assessment subsystem 226 is configured to assess an accuracy of the extracted one or more financial information by comparing the extracted one or more financial information with one or more reference financial information. |

-continued

| Plurality of Subsystems 110 | Functionality |
|---|---|
| Re-training subsystem 228 | The re-training subsystem 228 is configured to re-train the ML model to optimize the extraction processes, based on one or more feedback on one or more evaluation reports. |

The one or more hardware processors 204, as used herein, means any type of computational circuit, including, but not limited to, at least one of: a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 204 may also include embedded controllers, including at least one of: generic or programmable logic devices or arrays, application specific integrated circuits, single-chip computers, and the like.

The memory 202 may be non-transitory volatile memory and non-volatile memory. The memory 202 may be coupled for communication with the one or more hardware processors 204, being a computer-readable storage medium. The one or more hardware processors 204 may execute machine-readable instructions and/or source code stored in the memory 202. A variety of machine-readable instructions may be stored in and accessed from the memory 202. The memory 202 may include any suitable elements for storing data and machine-readable instructions, including at least one of: read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 202 includes the plurality of subsystems 110 stored in the form of machine-readable instructions on any of the above-mentioned storage media and may be in communication with and executed by the one or more hardware processors 204.

The storage unit 206 may be a cloud storage, a Structured Query Language (SQL) data store, a noSQL database or a location on a file system directly accessible by the plurality of subsystems 110.

The plurality of subsystems 110 includes the document obtaining subsystem 210 that is communicatively connected to the one or more hardware processors 204. The data obtaining subsystem 210 is configured to obtain the one or more documents from the one or more data sources 108. In an embodiment, the one or more data sources 108 may be one or more financial data repositories, which are integrated in the ML-based system 104. In an embodiment, the one or more documents may be the one or more financial documents (e.g., the one or more remittance documents) that include at least one of: one or more invoices, one or more payment confirmations, one or more general communications, and the like.

In an embodiment, the one or more data sources 108 may store the one or more documents in one or more formats and languages, and the document obtaining subsystem 210 of the ML-based system 104 may be configured to automatically identify and retrieve the one or more relevant documents. The document obtaining subsystem 210 may be configured to store the one or more documents composed in any languages (e.g., English). The document obtaining subsystem 210 may be configured to allow the one or more end users to manually upload the one or more documents through the one or more user interfaces. The one or more user interfaces may provide validation and error checking, ensuring that only valid document formats are uploaded. The document obtaining subsystem 210 may be configured to retrieve the one or more documents from one or more third-party databases through one or more application programming interfaces (APIs). The document obtaining subsystem 210 may be configured to support a range of application programming interfaces (APIs) which may be used for retrieving the one or more documents in one or more formats.

The document obtaining subsystem 210 is configured to handle an input of the data files associated with the one or more documents. In an embodiment, the data files associated with the one or more documents may be in at least one of: a portable document format (PDF), an electronic mail format (EML), a text format, an image format, and the like. In an embodiment, the ML-based system 104 may be configured to provide a feedback to the one or more end users through the one or more electronic devices 102 if the one or more documents are not in a format that may be handled by the ML-based system 104. In an embodiment, the document obtaining subsystem 210 is configured to authenticate the one or more end users and to provide secure access to the one or more documents.

The plurality of subsystems 110 includes the data pre-processing subsystem 212 that is communicatively connected to the one or more hardware processors 204. The data pre-processing subsystem 212 is configured to pre-process the one or more documents to generate the pre-processed data associated with one or more contents. The document pre-processing subsystem 212 is configured to extract data from the one or more electronic documents, using a document scraper model, wherein the data comprise at least one of: one or more words, one or more phrases, one or more numbers, and one or more characters with metadata. In other words, the data pre-processing subsystem 212 is configured to parse and scrape the data from the one or more documents, using a document scraper model. The document scraper model may scrape at least one of: words, phrases, numbers and special characters along with relevant metadata. The document scraper model may utilize at least one of: open-source PDF parser or Image OCR libraries in Python, to read text characters and their associated information including at least one of: coordinates, encoding, font, font style and text rotations from the one or more documents.

The document scraper model is configured to store extracted information in a configurable structured format including at least one of: a scraper document database and a file. The scraper document database or the file may be updated dynamically later. In an embodiment, the scraped information may be stored in a relational database or a NoSQL database that is hosted in a local server or hosted in a cloud server. The scraped information may also be stored in a flat file format, such as CSV or JSON. In an embodiment, there are different types of data that may be found in the file.

For example, the data may be textual data that are the most common type of data found in the data files. The text may be in any language and formatted with different fonts, sizes, colors, and styles. The data may be image data that include one or more images of various formats including at least one of: Joint Photographic Experts Group (JPG), Portable Network Graphic (PNG), Graphics Interchange Format (GIF), and Tag Image File Format (TIFF). The images may be embedded in the one or more documents or referenced from an external source. The data may include one or more annotations including at least one of: comments, highlights, and bookmarks. The one or more annotations may be added by an author or by the one or more end users who have access to the one or more documents.

The data may include one or more links to other documents, web pages, and media files. The one or more links may be embedded in the one or more documents or referenced from the external source. In an embodiment, the metadata may be different for each file type and may include font information, character encoding, character styles, word spacing, line spacing, paragraph spacing, paragraph styles, text positioning, text flow, language, annotations, tags, hyperlinks, bookmarks, comments, and the like. The font information may include name of the font used, size of the font, and other font-related properties. The character encoding may include information about a character set used in the one or more documents including Unicode or American Standard Code for Information Interchange (ASCII).

The character styles may include information about formatting of characters (e.g., bold or italic). The word spacing may refer to an amount of space between words in a line of text. The line spacing may refer to the amount of space between the lines of text. The paragraph spacing may refer to the amount of space between paragraphs. The paragraph styles may include information about the formatting of paragraphs including alignment, line spacing, and indentation. The text positioning may include information about a location of the text on the page including coordinates of a text box. The may include information about a direction of a text flow including at least one of: left-to-right text flow and right-to-left text flow. The language may include information about a language of the text. The annotations are notes or comments added to the text by the author or other reviewers. The tags are metadata tags that may be used to provide semantic information about the text including identifying headings or footnotes. The hyperlinks are links to other documents or websites that are embedded in the text. The bookmarks are links to specific locations within the document that may be used for navigation. The comments are notes or annotations that may be added to the text by the author or other reviewers.

In the context of spreadsheet type files, the metadata may further include at least one of: cell formatting, cell styles, worksheet metadata, data validation, formulas, and the like. The cell formatting may include information about formatting of cells including at least one of: font size, color, and alignment. The cell styles may include information about pre-defined formatting styles for the cells including at least one of: "Title," "Heading," and "Currency." The worksheet metadata may include information about the worksheet itself including a name of the worksheet, an author, date created, and the date last modified. The data validation may include information about any validation rules applied to the cells including requiring specific input values or data types. The formulas may include information about any formulas used in the cells including the formula itself and the range of cells used in the calculation.

In the context of image type files, the metadata may further include at least one of: image dimensions, image format, color profile, resolution, compression, and the like. The image dimensions may include information about size of the image including height and width in pixels, of the image. The image format may include information about a file format including JPEG, PNG, and TIF. The color profile may include information about a color space used in the image including red green blue (RGB) or Adobe RGB. The resolution may include information about resolution of the image including a number of pixels per inch or centimeter. The compression may include information about compression used in the image file including lossless or lossy compression. In an embodiment, for different file types, the parsing is done and relevant textual data, image data, and metadata, are extracted.

The data pre-processing subsystem 212 is further configured to obtain the scraped information from the document scraper model. The data pre-processing subsystem 212 may include a content processing model that may include a rule engine. The rule engine is configured to receive and store one or more custom rules pertaining to the one or more documents. The document pre-processing subsystem 212 is further configured to group the data based on at least one of: parts of speech of at least one of: the one or more words and the one or more phrases, relationship between at least one of: the one or more words and the one or more phrases, and meaning of at least one of: the one or more words and the one or more phrases, using the one or more custom rules. Using the one or more custom rules based on character distances and their properties, these text characters are grouped together into words and phrases. For example, "Invoice Number" may be considered as a single phrase including two words. However, "Vendor Item description" may be broken down to a word and a phrase, "Vendor" and "Item description".

The data pre-processing subsystem 212 is further configured to obtain the data from the content processing model. The data pre-processing subsystem 212 further includes a noise removal model with the rule engine. The document pre-processing subsystem 212 with the noise removal model is further configured to at least one of: (a) replace each character in the one or more contents with one or more corresponding Unicode string values, based on one or more custom noise removal rules, (b) remove one or more punctuations before the one or more phrases in the one or more contents, based on the one or more custom noise removal rules, and (c) remove one or more characters that are recurred, from the one or more contents, based on the one or more custom noise removal rules.

The plurality of subsystems 110 includes the content classifying subsystem 214 that is communicatively connected to the one or more hardware processors 204. The content classifying subsystem 214 is configured to obtain an output of the noise removal model. The content classifying subsystem 214 is configured to classify the one or more contents as the one or more potential key-value pairs corresponding to the one or more financial information based on the one or more system prompts, using the ML model. The ML model may be a generative artificial intelligence (GenAI) model, large language model (LLMs), discriminative model, reinforcement learning model, supervised learning model, unsupervised learning model, semi-supervised learning model, and the like. In an embodiment, the ML mode may be a GenAI based natural language processing (NLP) model that is used to perform a task of classifying content entities (words and phrases) into invoice number and payment amount. The content classifying subsystem 214 is further configured to group relevant invoice number and payment amount pairs together based on a Document Intelligence provided in the form of document alignment and the one or more system prompts, doing away with any form of rule engine altogether.

The plurality of subsystems 110 includes the key-value extracting subsystem 216 that is communicatively connected to the one or more hardware processors 204. The key-value extracting subsystem 216 is configured to extract the one or more potential key-value pairs corresponding to the one or more financial information, using the ML model. The plurality of subsystems 110 includes the key-value correcting subsystem 218 that is communicatively connected to the one or more hardware processors 204. The key-value correcting subsystem 218 is configured to correct the one or more potential key-value pairs to obtain one or more corrected key-value pairs corresponding to the one or more financial information based on one or more custom prompts, using the ML model.

For classifying the one or more contents as one or more potential key-value pairs corresponding to the one or more financial information based on one or more system prompts, using the ML model, the content classifying subsystem 214 is initially configured to convert the pre-processed data into unstructured data having a single unstructured string based on at least one of lines, tabs, spaces within the one or more documents, while maintaining the alignment information based on stop words including newline/newtab/spaces, to provide alignment information associated with the one or more documents to the ML model. The content classifying subsystem 214 is further configured to generate the one or more system prompts to classify the unstructured data as one or more potential key-value pairs using NLP techniques.

The generation of the one or more system prompts may include performing alignment or self-alignment of the one or more documents based on the unstructured data using the ML model being pre-trained on a plurality of documents, to mitigate one or more alignment errors from the one or more documents. The ML model is instructed to generate all relevant key-value pairs from the one or more documents from financial data point of view. The generation of the one or more system prompts may include obtaining one or more localization information (e.g., account, customer, industry, and the like) from one or more users. The one or more system prompts utilize the one or more localization information for classifying the unstructured data as one or more potential key-value pairs. The one or more localization information are used for the ML model to select the relevant key-value pair based on some criteria. For example if the ML model has identified Invoice Number, Document Number and Reference Number pairs, the above process helps the ML model decide which key-value pair to extract.

In an embodiment, post-processing steps may be added in the ML model instructions based on requirements that may include at least one of: amount normalization, handling decimal point missing in amount, handling different annotations used to show negative amounts, and recurring of keywords based common patterns. For example, "Your Document" key vs "Document" Key, where presence of "Your" keyword is given higher preference.

The plurality of subsystems 110 includes the prompt generating subsystem 222 that is communicatively connected to the one or more hardware processors 204. The prompt generating subsystem 222 is configured to automatically generate the one or more custom prompts using the auto prompt generation engine (APGE). The APGE is a proprietary framework created to automate custom prompts flow. The APGE learns from historical exception payments/remittances to understand underlying prefix-suffix addition and/or deletion patterns in user edits. The patterns are used to train a tree based classifier model (e.g., Random Forest model) to classify the Prefix/Suffix addition/deletion pattern in order to add it as a custom prompt to a generative pre-trained transformer (GPT) model.

For generating the one or more custom prompts using the APGE, the prompt generating subsystem 222 is configured to obtain historical data associated with one or more historical documents. The historical data may include at least one of: historical state end and file definition language (FDL) data for one or more entities present in the one or more historical documents. In an embodiment, the historical data may be fetched from a database for exception remittances which was cleared with the help of user edits. In an embodiment, an issue bucketization model is used to determine one or more occurrences (e.g., one or more reasons) in the one or more historical documents to segregate the one or more historical documents. The one or more occurrences may include at least one of: one or more user edits including at addition and subtraction of at least one of: prefix and suffix, mis-capture of information in the one or more historical documents during Optical Character Recognition (OCR), and missing of information in the one or more historical documents.

The prompt generating subsystem 222 is further configured to generate the one or more custom prompts by identifying one or more patterns associated with the one or more occurrences in the one or more historical documents. The one or more custom prompts may enable the ML model to correct the one or more potential key-value pairs into the one or more corrected key-value pairs by performing the at least one of: the addition and the subtraction of the at least one of: the prefix and the suffix to at least one of: one or more potential keys and one or more potential values, within the one or more potential key-value pairs. The prompt generating subsystem 222 is further configured to store the one or more custom prompts along with one or more generic prompts in one or more prompt repositories.

The plurality of subsystems 110 includes the training subsystem 224 that is communicatively connected to the one or more hardware processors 204. The training subsystem 224 is configured to obtain the one or more custom prompts from the one or more prompt repositories, as the input at the ML model, to learn the one or more patterns associated with the one or more occurrences in the one or more historical documents. The training subsystem 224 is further configured to encode the one or more patterns associated with the one or more occurrences. The one or more patterns associated with the one or more occurrences are encoded as at least one of: presence of the keyword in the one or more documents, location of the keyword, and frequency of occurrence of the keyword in the one or more documents. In an embodiment, localization features including company code, customer identity, are encoded as at least one of: categories and aggregate features like occurrence of the keyword for each localization.

The training subsystem 224 is further configured to label the one or more patterns associated with the one or more occurrences, in one or more formats to obtain a labelled information. The one or more formats may include at least one of: prefix being added as +[keyword], suffix being added as [keyword]+, prefix being subtracted as −[keyword], and suffix being subtracted as [keyword]−. The training subsystem 224 is further configured to enable the labelled information by assigning each labelled information with one or more numeric values. The training subsystem 224 is further configured to store the encoded labelled information, in a lookup table for training and inferencing by the ML model.

In an embodiment, the training subsystem 224 is further configured to train the ML model using one or more hyperparameters. A Random Forest based multi class classifier model is trained on the data with the given input features and the target. In an embodiment, the one or more hyperparameters may include at least one of: n_estimators indicating a number of trees in a forest model, optimum features (i.e., max_features) indicating optimum number of features considered for splitting a node, optimum depth (i.e., max_depth) indicating optimum number of levels in each decision tree, minimum samples split (i.e., min_samples_split) indicating minimum number of data points placed in the node prior to split of the node, minimum samples leaf (i.e., min_samples_leaf) indicating minimum number of the data points allowed in a leaf node, and bootstrap indicating a method for sampling the data points.

In an embodiment, the one or more hyperparameters are automatically adjusted to determine one or more optimized hyperparameters in a subset value of each of the one or more hyperparameters. In an embodiment, cross validation is used to determine the best possible ML model without overfitting on test data.

During inference time, the ML model is run on the incoming remittance, where invoice level features are extracted from the given remittance information and aggregate level features are computed based on the feature store maintained from the training process. Each Remittance is classified into a possible target label based on model prediction. Probability threshold is kept high to mitigate frequent false positives. A numerical target lookup table is used to obtain the relevant keyword and action (add/sub) from the label and the relevant keyword and action is added as a custom prompt to the GPT model. Each target may include a possible Prompt Engineering Instructions associated with it to convert the action to an instruction prompt.

In an embodiment, the output of the GPT model is provided in JSON file that includes garbage annotations as extra quotes, appended "JSON" keyword, newline character, and the like. Based on the presence of these annotations, they are removed from the final output to get a clean JSON file to be consumed in the output stages.

The plurality of subsystems 110 includes the output subsystem 220 that is communicatively connected to the one or more hardware processors 204. The output subsystem 220 is configured to provide the one or more corrected key-value pairs corresponding to the one or more financial information as the output, to the one or more end users on one or more user interfaces associated with the one or more electronic devices 102 associated with the one or more end users. The data associated with the one or more corrected key-value pairs are classified and stored in a JSON file. In an embodiment, the output subsystem 220 is configured to generates a structured representation of the one or more financial information extracted. The one or more financial information extracted, are further categorised in a page it belonged to and a page level list of JSON is created to provide all invoice line items in the page as a list of JSON.

In an embodiment, the output data are returned back to a third party system calling an API (e.g., CAA Product) in the aforementioned output format with relevant metadata for their consumption. The output data may be ingested in backend databases for Create, Read, Update, and Delete (CRUD) based consumption and further rules processing.

The plurality of subsystems 110 includes the accuracy assessment subsystem 226 that is communicatively connected to the one or more hardware processors 204. The accuracy assessment subsystem 226 is configured to assess an accuracy of extracted one or more financial information by comparing the extracted one or more financial information with one or more reference financial information. The accuracy assessment subsystem 226 is configured to utilize one or more techniques including at least one of: exact matching, fuzzy matching, and similarity metrics, to evaluate correctness and consistency of the extracted data (i.e., the extracted one or more financial information). The accuracy assessment subsystem 226 is configured to quantify accuracy using appropriate evaluation metrics including at least one of: precision, recall, or any other suitable measure, to provide a comprehensive assessment of the data extraction process.

The accuracy assessment subsystem 226 is further configured to generate one or more evaluation reports providing one or more insights into the accuracy of the extracted one or more financial information. The one or more evaluation reports may highlight at least one of: error patterns, error distribution across different document types or data elements, and identify specific types and sources of errors. The one or more evaluation reports may include at least one of: visualizations, statistical summaries, and detailed error analysis, to facilitate a comprehensive understanding of the accuracy assessment results.

The accuracy assessment subsystem 226 is further configured to generate one or more feedback based on the one or more evaluation reports to guide improvements in the data extraction process. The accuracy assessment subsystem 226 is configured to identify specific patterns or rules contributing to errors and provides actionable recommendations for refinement. In an embodiment, the one or more feedback may include at least one of: one or more suggestions for adjusting one or more parameters of the ML model, data preprocessing techniques, feature selection, or other aspects of the data extraction pipeline.

The accuracy assessment subsystem 226 is further configured to automatically generate one or more feedback in at least one of: real-time and periodic, on the one or more evaluation reports to provide one or more suggestions on the extraction process. The accuracy assessment subsystem 226 is configured to integrate with the data extraction pipeline, automatic assessment of the accuracy, generation of the one or more evaluation reports, and provision of the one or more feedback, without manual intervention. The accuracy assessment subsystem 226 is configured to support automation through at least one of: use of APIs, event triggers, and workflow integration, ensuring timely and automated feedback incorporation into the data extraction process.

The accuracy assessment subsystem 226 is further configured to monitor performance of the extraction process over time to determine one or more changes in accuracy metrics and error patterns. The accuracy assessment subsystem 226 is configured to enable comparisons between different iterations or versions of the ML model or data extraction pipeline, to evaluate the impact of feedback and improvement efforts.

The plurality of subsystems 110 includes the re-training subsystem 228 that is communicatively connected to the one or more hardware processors 204. The re-training subsystem 228 is configured to re-train the ML model to optimize the extraction processes based on the one or more feedback on the one or more evaluation reports. The re-training of the ML model by the re-training subsystem 228 involves at least one of: adjusting the one or more parameters, pre-processing the data, selecting the one or more features, and one or more processes associated with the data extraction.

In an embodiment, upon training the ML model, the ML model may be deployed to a cloud production environment. The cloud production environment may be any cloud computing platform, including at least one of: Amazon Web Services (AWS), Microsoft Azure, Google Cloud Platform (GCP), and the like. In an embodiment, the ML model may be deployed to the cloud production environment using any standard ML framework. For example, the ML model may be deployed using TensorFlow, PyTorch, scikit-learn, and the like.

Figure 3:
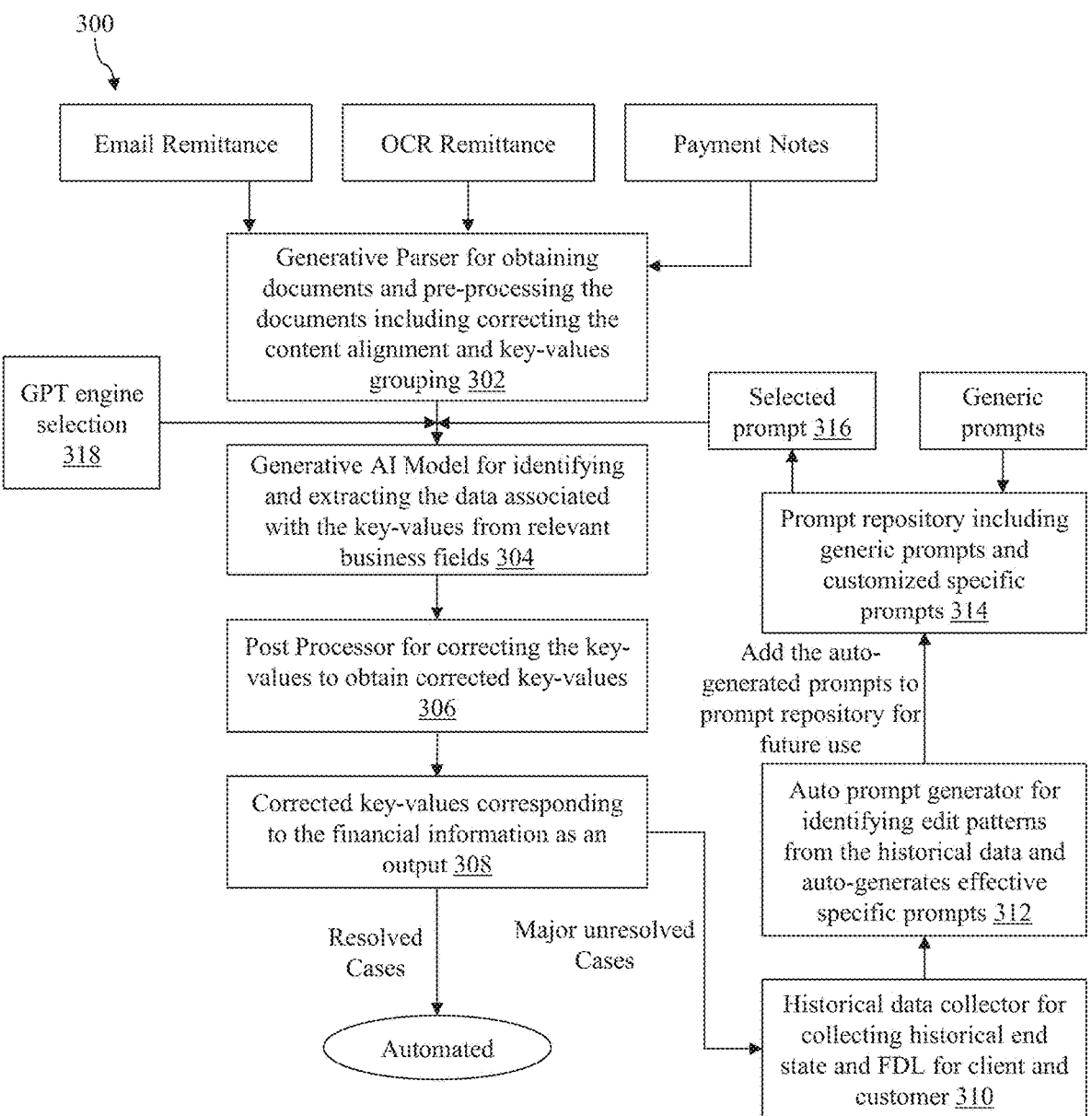
FIG. 3 is a flow chart illustrating a method for automatically extracting and correcting the one or more financial information from the one or more documents using one or more custom prompts, in accordance with another embodiment of the present disclosure.

FIG. 3 is an overall flow chart 300 illustrating a method for automatically extracting and correcting the one or more financial information from the one or more documents using the one or more custom prompts, in accordance with another embodiment of the present disclosure. At step 302, the one or more documents (e.g., one or more email remittance, one or more OCR remittance, and one or more payment notes) are obtained and pre-processed to correct the content alignment and to group the key-values. At step 304, the ML model is configured to identify and extract the data associated with the key-values from relevant business fields of the one or more documents. At step 306, the key-values are post-processed using a post-processor to obtain the corrected key-values. At step 308, the corrected key-values corresponding to the one or more financial information are obtained as an output.

The key-value pairs related to financial information, when left unresolved or unrecognized due to inconsistencies or inaccuracies that stray from standard formats, can are effectively corrected using the APGE model. A historical data collector is configured to collect historical end state and FDL for client and customer, as shown in step 310. At step 312, the APGE model is configured for identifying one or more edit patterns from the historical data and to auto-generate effective specific prompts. In an embodiment, the auto-generated prompts to a prompt repository for future use. At step 314, the one or more generic prompts and specific prompts are stored in the prompt repository to generate the one or more custom prompts. At step 316, the generated one or more custom prompts are used for identifying and extracting the data associated with the key-values corresponding to the one or more financial information.

At step 318, the most appropriate version of the GPT model for a specific application application, is selected based on various criteria using a GPT engine. The GPT model is selected based on model's capabilities with one or more key factors including at least one of: language understanding, generation quality, and contextual awareness. In an embodiment, different versions of GPT models (e.g., GPT-3 or GPT-4) offer varying levels of performance, which may impact response quality and conversational fluency. Further, practical considerations including at least one of: the cost of usage, whether billed per token or through subscription, play a crucial role in selection, especially for applications with high volume requirements. Furthermore, the scalability of GPT model is evaluated to adapt to growing demands and its compatibility with existing systems. Ultimately, the selection process should align not only with technical performance metrics but also with budget constraints and long-term use case objectives.

Figure 4:
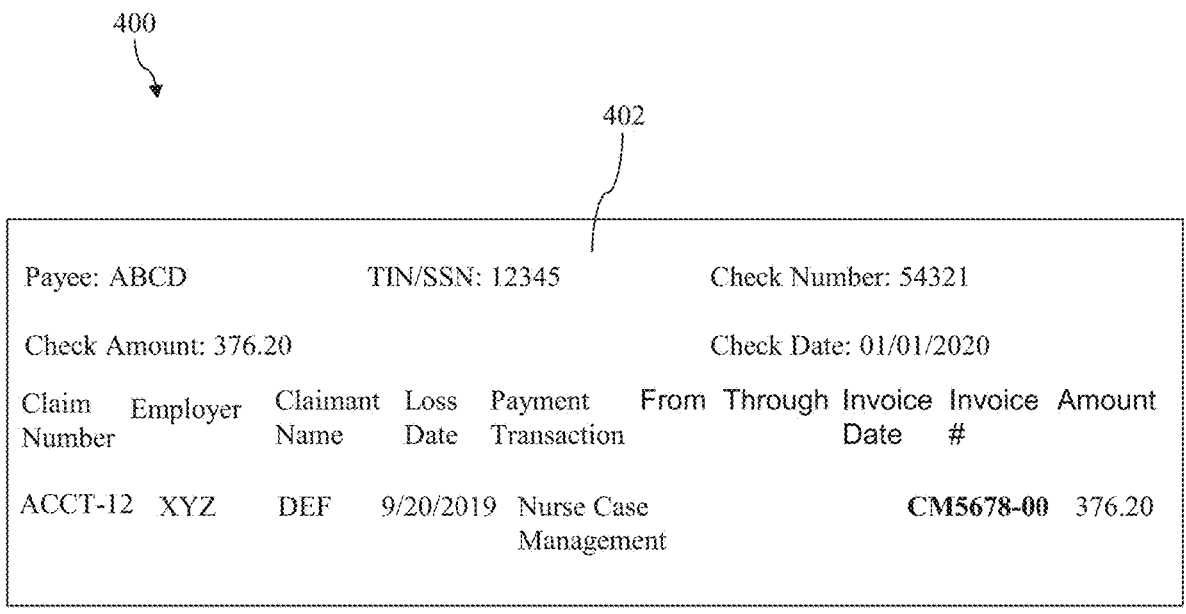
FIG. 4 is an exemplary tabular view depicting extraction of the one or more financial information from the one or more documents.

FIG. 4 is an exemplary tabular view 400 depicting extraction of the one or more financial information 402 from the one or more documents. The exemplary tabular view 400 depicts that the ML based system 104 is configured to obtain the one or more documents as an input with one or more fields including at least one of: claim number, employer details, claimant name, loss date, payment transaction, from detail, through detail, invoice date, invoice number, amount, and the like. In an embodiment, the request script for extracting the one or more financial information (e.g., the invoice number) 402 from the one or more documents is given below:

```
{
    "accountId": 1,
    "payload": [
        {
            "headerInfo": [
                {
                    "xmlFilePath": "xmlFilePath",
                    "pageNumber": 1
                    "imagePath": "imageFilePath"
                }
            ],
            "ocrEngine": "OCR_ENGINE",
            "accountName": "XYZ",
            "fkCustomerMapId": -1,
            "accountId": 9876,
            "productCode": "COMMON",
            "primaryKey": 1234,
            "GenAI": 1
        }
    ],
    "aiUsecaseName": "Entity Extraction",
    "isRequestResponse": "true"
}
```

In an embodiment, the response script for extracting the one or more financial information from the one or more documents is given below.

```
{
"Response": {
    "output": [
        {
            "predictions": {
                "1": {
                    "metaData": {
                        "latency": {
                            "postprocessing_time": "0.00031757354794338125",
                            "preprocessing_time": "1.1925378953249456",
                            "overall_pipeline_execution_time": "2.6532753639",
                            "live_invocation_time": "1.227739953443027"
                        },
                        "backend": {
                            "model": "model_name",
                            "backend_endpoint": "url",
                            "aim_endpoint": "apin_url"
                        },
                        "token": {
                            "completion_token": "21",
                            "estimated_cost": "0.0139",
                            "prompt_token": "1327",
                            "total_token": "1348"
                        }
                    },
                    "errorMessage": "".
                    "itemInfo": [
                        {
                            "total_amount": "".
                            "discount_amount": "",
                            "reference_field": "CM21052831-00",
                            "effective_date": "",
                            "payment_amount": "376.2",
                            "deduction_amount": ""
                        }
                    ]
                },
                "headerInfo": {
                    "payment_number": "",
                    "total_amount": "",
                    "ocrUsed": "OCR_ENGINE",
```

-continued

```
                    "payer_name": "",
                    "payment_date": ""
                }
            },
            "primaryKey": "1234"
        }
    ],
    "code": 200,
    pythonWSCode: 200,
    "message": "PARTIALLY_PROCESSED",
    "status": "SUCCESS"
    }
}
```

FIG. 5 is a process flow 500 depicting extraction and correction of the one or more financial information from the one or more documents using the auto prompt generation engine (APGE), in accordance with another embodiment of the present disclosure. The process flow 500 is an exemplary process based on extraction and correction of the one or more financial information. At step 502, an invoice number is obtained from the one or more documents. In this instance, the one or more financial information comprises an invoice number mentioned as 17279. At step 504, one or more input features associated with the invoice number, are created from the one or more documents and payment details. At step 506, the one or more input features are inputted into the ML model and the ML model is executed. At step 508, the +[keyword]label (i.e., prefix being added) is predicted to perform keywork lookup operation, as shown in step 510. At step 512, a customer lookup table is generated from the training flow. At step 514, the keyword "MI" is determined using the ML model. At step 516, one or more custom or augmented prompts are generated and the ML model is utilized, as shown in step 518, to provide the corrected potential invoice number "MI17279", as shown in step 520.

FIG. 6 is an exemplary tabular view 600 depicting extraction and correction of the one or more financial information from the one or more documents, such as those shown in FIG. 5. The exemplary tabular view 600 depicts that the ML based system 104 is configured to identify and extract the data associated with the key-values (e.g., the corrected invoice number—"MI17279" 502) from relevant business fields of the one or more documents. In an embodiment, FIG. 6 having the corrected invoice number "MI17279" 602 that is generated as an output of the processes mentioned in FIG. 5. In an embodiment, the request script for extracting the key-values, from the one or more documents is given below.

```
{
    "accountId": 1,
    "payload": [
        {
            "headerInfo": [
                {
                    "xmlFilePath": "xmlFilePath",
                    "pageNumber": 1
                    "imagePath": "imageFilePath"
                }
            ],
            "ocrEngine": "OCR_ENGINE",
            "accountName": "XYZ",
            "fkCustomerMapId": -1,
            "accountId": 9876,
```

-continued

```
        "productCode": "COMMON",
        "primaryKey": 1234,
        "GenAI": 1
      }
    ],
    "aiUsecaseName": "Entity Extraction",
    "isRequestResponse": "true"
  }
```

In an embodiment, the response script for extracting the key-values 602, from the one or more documents is given below.

```
{
  "Response": {
    "output": [
      {
        "predictions": {
          "1": {
            "metaData": {
              "latency": {
                "postprocessing_time": "0.0001",
                "preprocessing_time": "1.19",
                "overall_pipeline_execution_time": "2.63",
                "llm_invocation_time": "1.22"
              },
              "backend": {
                "model": "model_name",
                "backend_endpoint": "url",
                "api_endpoint": "api_url"
              },
              "token": {
                "completion_token": "21",
                "estimated_cost": "0.0139",
                "prompt_token": "1327",
                "total_token": "1348"
              }
            },
            "errorMessage": "",
            "itemInfo": [
              {
                "total_amount": " ",
                "reference_number": "1.1279",
                "effective_date": " ",
                "document_amount": "3640.88",
                "equivalent_amount": " ",
              }
            ]
          },
          "headerInfo": {
            "payment_number": " ",
            "total_amount": " ",
            "ocrUsed": "OCR_ENGINE",
            "payer_name": " ",
            "payment_date": " ",
          }
        },
        "primaryKey": "1234"
      }
    ]
  },
  "code": "200",
  "pythonWSCode": 200,
  "message": "PARTIALLY_PROCESSED",
  "status": "SUCCESS"
}
```

Figure 7:
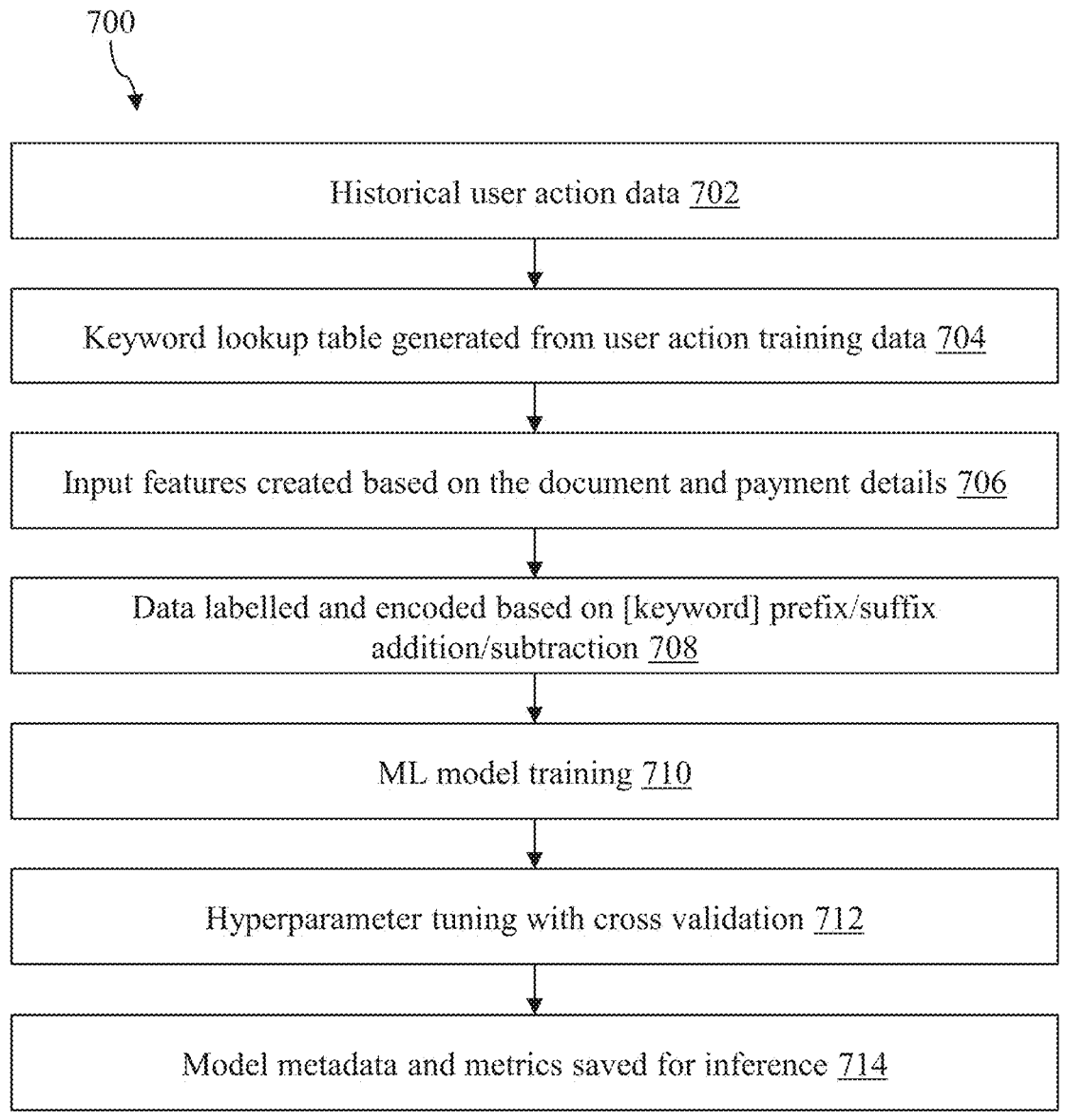
FIG. 7 is a process flow depicting training of the auto prompt generation engine (APGE), such as those shown in FIG. 5, in accordance with another embodiment of the present disclosure.

FIG. 7 is a process flow 700 depicting training of the auto prompt generation engine (APGE), such as those shown in FIG. 5, in accordance with another embodiment of the present disclosure. At step 702, the historical data (i.e., historical user action data) is fetched from the database for exception remittances which was cleared with the help of user edits. At step 704, a keyword lookup table is generated from the historical user action data. At step 706, the input features are created based on the one or more documents and payment details. At step 708, the features associated with the data are labelled and encoded based on the one or more occurrences (i.e., prefix/suffix addition/subtraction). At step 710, the ML model is trained using the one or more hyperparameters. At step 712, the one or more hyperparameters are automatically adjusted to determine the one or more optimized hyperparameters in the subset value of each of the one or more hyperparameters. At step 714, the metadata and metrics, of the ML model are saved in the lookup table for training and inferencing by the ML model.

FIG. 8 is a flow chart illustrating a machine-learning based (ML-based) method 800 for automatically extracting and correcting the one or more financial information from the one or more documents, in accordance with an embodiment of the present disclosure. At step 802, the one or more documents are obtained from the one or more data sources 108. At step 804, the one or more documents are pre-processed to generate the pre-processed data associated with the one or more contents. At step 806, the one or more contents are classified as the one or more potential key-value pairs corresponding to the one or more financial information based on the one or more system prompts, using the ML model.

At step 808, the one or more potential key-value pairs corresponding to the one or more financial information are extracted using the ML model. At step 810, the one or more potential key-value pairs are corrected to obtain the one or more corrected key-value pairs corresponding to the one or more financial information based on the one or more custom prompts, using the ML model. At step 812, the one or more corrected key-value pairs corresponding to the one or more financial information, are provided as the output, to the one or more end users on the one or more user interfaces associated with the one or more electronic devices 102 associated with the one or more end users. At step 814, the ML model is re-trained to optimize the extraction processes based on the one or more feedback on the one or more evaluation reports. In an embodiment, the re-training of the ML model involves at least one of: adjusting the one or more parameters, pre-processing the data, selecting the one or more features, and one or more processes associated with the data extraction.

The present invention has following advantages. The primary purpose of the present invention with the ML-based system 104 is to automatically extract and correct the one or more financial information from the one or more documents. The ML-based system 104 is designed to identify the one or more financial information within a remittance document, regardless of its structure or alignment. Additionally, the ML-based system 104 autonomously learns to recognize any prefixes or suffixes that have been added or removed from the one or more financial information, allowing the prefixes or suffixes to make corrections and generate accurate key-value pairs. This capability of the present invention, streamlines the entire process, enhancing header and item automation while potentially resulting in significant savings in full-time equivalent (FTE) staffing. The ML-based system 104 is configured to extract and correct the one or more financial information from the one or more documents, though the remittance documents are not structured or aligned in a typical format.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer-readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the ML-based system 104 either directly or through intervening I/O controllers. Network adapters may also be coupled to the ML-based system 104 to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/ML-based system 104 in accordance with the embodiments herein. The ML-based system 104 herein comprises at least one processor or central processing unit (CPU). The CPUs are interconnected via the system bus 208 to various devices including at least one of: a random-access memory (RAM), read-only memory (ROM), and an input/output (I/O) adapter. The I/O adapter can connect to peripheral devices, including at least one of: disk units and tape drives, or other program storage devices that are readable by the ML-based system 104. The ML-based system 104 can read the inventive instructions on the program storage devices and follow these instructions to execute the methodology of the embodiments herein.

The ML-based system 104 further includes a user interface adapter that connects a keyboard, mouse, speaker, microphone, and/or other user interface devices including a touch screen device (not shown) to the bus to gather user input. Additionally, a communication adapter connects the bus to a data processing network, and a display adapter connects the bus to a display device which may be embodied as an output device including at least one of: a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that are issued on an application based here on. Accordingly, the embodiments of the present invention are intended to be illustrative, but not limiting, of the scope of the invention, which is set forth in the following claims.

What is claimed is:

1. A machine-learning based (ML-based) method for automatically extracting and correcting one or more financial information from one or more documents, the ML-based method comprising:

obtaining, by one or more hardware processors, the one or more documents from one or more data sources;

pre-processing, by the one or more hardware processors, the one or more documents to generate pre-processed data associated with one or more contents;

classifying, by the one or more hardware processors, the one or more contents as one or more potential key-value pairs corresponding to the one or more financial information based on one or more system prompts, using a machine learning (ML) model, wherein classifying the one or more contents as one or more potential key-value pairs corresponding to the one or more financial information based on one or more system prompts, using the ML model, comprises:

converting, by the one or more hardware processors, the pre-processed data into unstructured data having a single unstructured string based on at least one of lines, tabs, spaces within the one or more documents, to provide alignment information associated with the one or more documents to the ML model; and generating, by the one or more hardware processors, the one or more system prompts to classify the unstructured data as one or more potential key-value pairs using Natural Language Processing (NLP) techniques, wherein the generation of the one or more system prompts includes one of:

performing, by the one or more hardware processors, alignment of the one or more documents based on the unstructured data using the ML model being pre-trained on a plurality of documents, to mitigate one or more alignment errors from the one or more documents; and obtaining, by the one or more hardware processors, one or more localization information from one or more users, wherein the one or more system prompts utilize the one or more localization information for classifying the unstructured data as one or more potential key-value pairs;

extracting, by the one or more hardware processors, the one or more potential key-value pairs corresponding to the one or more financial information, using the ML model;

correcting, by the one or more hardware processors, the one or more potential key-value pairs to obtain one or more corrected key-value pairs corresponding to the one or more financial information based on one or more custom prompts, using the ML model; and providing, by the one or more hardware processors, the one or more corrected key-value pairs corresponding to the one or more financial information as an output, to one or more end users on one or more user interfaces associated with one or more electronic devices associated with the one or more end users.

2. The ML-based method of claim 1, further comprising automatically generating, by the one or more hardware processors, the one or more custom prompts using an auto prompt generation engine (APGE) by:

obtaining, by the one or more hardware processors, historical data associated with one or more historical documents, wherein the historical data comprise at least one of: historical state end and file definition language (FDL) data for one or more entities present in the one or more historical documents;

determining, by the one or more hardware processors, one or more occurrences in the one or more historical documents to segregate the one or more historical documents, wherein the one or more occurrences comprise at least one of: one or more user edits comprising addition or subtraction of at least one of: prefix and suffix, mis-capture of information in the one or more historical documents during Optical Character Recognition (OCR), and missing of information in the one or more historical documents;

generating, by the one or more hardware processors, the one or more custom prompts by identifying one or more patterns associated with the one or more occurrences in the one or more historical documents, wherein the one or more custom prompts enable the ML model to correct the one or more potential key-value pairs into the one or more corrected key-value pairs by performing the at least one of: the addition and the subtraction of the at least one of: the prefix and the suffix to at least one of: one or more potential keys and one or more potential values, within the one or more potential key-value pairs; and storing, by the one or more hardware processors, the one or more custom prompts along with one or more generic prompts in one or more prompt repositories.

3. The ML-based method of claim 2, further comprising training, by the one or more hardware processors, the ML model by:

obtaining, by the one or more hardware processors, the one or more custom prompts from the one or more prompt repositories, as the input at the ML model, to learn the one or more patterns associated with the one or more occurrences in the one or more historical documents;

encoding, by the one or more hardware processors, the one or more patterns associated with the one or more occurrences;

labelling, by the one or more hardware processors, the one or more patterns associated with the one or more occurrences, in one or more formats to obtain a labelled information;

encoding, by the one or more hardware processors, the labelled information by assigning each labelled information with one or more numeric values; and storing, by the one or more hardware processors, the encoded labelled information, in a lookup table for training and inferencing by the ML model.

4. The ML-based method of claim 1, further comprising training, by the one or more hardware processors, the ML model using one or more hyperparameters, wherein the one or more hyperparameters comprise at least one of: n estimators indicating a number of trees in a forest model, optimum features indicating optimum number of features considered for splitting a node, optimum depth indicating optimum number of levels in each decision tree, minimum samples split indicating minimum number of data points placed in the node prior to split of the node, minimum samples leaf indicating minimum number of the data points allowed in a leaf node, and bootstrap indicating a method for sampling the data points, and wherein the one or more hyperparameters are automatically adjusted to determine one or more optimized hyperparameters in a subset value of each of the one or more hyperparameters.

5. The ML-based method of claim 1, wherein pre-processing the one or more documents comprises extracting, by the one or more hardware processors, data from the one or more electronic documents, using a document scraper model, wherein the extracted data comprise at least one of: one or more words, one or more phrases, one or more numbers, and one or more characters with metadata.

6. The ML-based method of claim 5, wherein pre-processing the one or more documents comprises grouping, by the one or more hardware processors, the data based on at least one of: parts of speech of at least one of: the one or more words and the one or more phrases, relationship between at least one of: the one or more words and the one or more phrases, and meaning of at least one of: the one or more words and the one or more phrases, using one or more custom rules.

7. The ML-based method of claim 6, wherein pre-processing the data associated with the one or more electronic documents further comprises at least one of:

replacing, by the one or more hardware processors, each character in the one or more contents with one or more corresponding Unicode string values, based on one or more custom noise removal rules;

removing, by the one or more hardware processors, one or more punctuations before the one or more phrases in the one or more contents, based on the one or more custom noise removal rules; and removing, by the one or more hardware processors, one or more characters that are recurred, from the one or more contents, based on the one or more custom noise removal rules.

8. The ML-based method of claim 1, further comprising:

assessing, by the one or more hardware processors, an accuracy of extracted one or more financial information by comparing the extracted one or more financial information with one or more reference financial information;

generating, by the one or more hardware processors, one or more evaluation reports providing one or more insights into the accuracy of the extracted one or more financial information;

automatically generating, by the one or more hardware processors, one or more feedback in at least one of: real-time and periodic, on the one or more evaluation reports to provide one or more suggestions on the extraction process; and monitoring, by the one or more hardware processors, performance of the extraction process over time to determine one or more changes in accuracy metrics and error patterns.

9. A machine learning based (ML-based) system for automatically extracting and correcting one or more financial information from one or more documents, the ML-based system comprising:

one or more hardware processors;

a memory coupled to the one or more hardware processors, wherein the memory comprises a plurality of subsystems in form of programmable instructions executable by the one or more hardware processors, and wherein the plurality of subsystems comprises:

a document obtaining subsystem configured to obtain the one or more documents from one or more data sources;

a document pre-processing subsystem configured to pre-process the one or more documents to generate pre-processed data associated with one or more contents;

a content classifying subsystem configured to classify the one or more contents as one or more potential key-value pairs corresponding to the one or more financial information based on one or more system prompts, using a machine learning (ML) model, wherein in classifying the one or more contents as one or more potential key-value pairs corresponding to the one or more financial information based on one or more system prompts, using the ML model, the content classifying subsystem is configured to:

convert the pre-processed data into unstructured data having a single unstructured string based on at least one of lines, tabs, spaces within the one or more documents, to provide alignment information associated with the one or more documents to the ML model; and generate the one or more system prompts to classify the unstructured data as one or more potential key-value pairs using Natural Language Processing (NLP) techniques, wherein the generation of the one or more system prompts includes one of:

performing alignment of the one or more documents based on the unstructured data using the ML model being pre-trained on a plurality of documents, to mitigate one or more alignment errors from the one or more documents; and obtaining one or more localization information from one or more users, wherein the one or more system prompts utilize the one or more localization information for classifying the unstructured data as one or more potential key-value pairs;

a key-value extracting subsystem configured to extract the one or more potential key-value pairs corresponding to the one or more financial information, using the ML model;

a key-value correcting subsystem configured to correct the one or more potential key-value pairs to obtain one or more corrected key-value pairs corresponding to the one or more financial information based on one or more custom prompts, using the ML model; and an output subsystem configured to provide the one or more corrected key-value pairs corresponding to the one or more financial information as an output, to one or more end users on one or more user interfaces associated with one or more electronic devices associated with the one or more end users.

10. The ML-based system of claim 9, further comprising a prompt generating subsystem configured to automatically generate the one or more custom prompts using an auto prompt generation engine (APGE), wherein in generating the one or more custom prompts using an auto prompt generation engine (APGE), the prompt generating subsystem is configured to:

obtain historical data associated with one or more historical documents, wherein the historical data comprise at least one of: historical state end and file definition language (FDL) data for one or more entities present in the one or more historical documents;

determine one or more occurrences in the one or more historical documents to segregate the one or more historical documents, wherein the one or more occurrences comprise at least one of: one or more user edits comprising addition or subtraction of at least one of: prefix and suffix, mis-capture of information in the one or more historical documents during Optical Character Recognition (OCR), and missing of information in the one or more historical documents;

generate the one or more custom prompts by identifying one or more patterns associated with the one or more occurrences in the one or more historical documents, wherein the one or more custom prompts enable the ML model to correct the one or more potential key-value pairs into the one or more corrected key-value pairs by performing the at least one of: the addition and the subtraction of the at least one of: the prefix and the suffix to at least one of: one or more potential keys and one or more potential values, within the one or more potential key-value pairs; and store the one or more custom prompts along with one or more generic prompts in one or more prompt repositories.

11. The ML-based system of claim 10, further comprising a training subsystem configured to train the ML model, wherein in training the ML model, the training subsystem is configured to:

obtain the one or more custom prompts from the one or more prompt repositories, as the input at the ML model, to learn the one or more patterns associated with the one or more occurrences in the one or more historical documents;

encode the one or more patterns associated with the one or more occurrences;

label the one or more patterns associated with the one or more occurrences, in one or more formats to obtain a labelled information;

encode the labelled information by assigning each labelled information with one or more numeric values; and store the encoded labelled information, in a lookup table for training and inferencing by the ML model.

12. The ML-based system of claim 9, wherein the training subsystem is further configured to train the ML model using one or more hyperparameters, wherein the one or more hyperparameters comprise at least one of: n estimators indicating a number of trees in a forest model, optimum features indicating optimum number of features considered for splitting a node, optimum depth indicating optimum number of levels in each decision tree, minimum samples split indicating minimum number of data points placed in the node prior to split of the node, minimum samples leaf indicating minimum number of the data points allowed in a leaf node, and bootstrap indicating a method for sampling the data points, and wherein the one or more hyperparameters are automatically adjusted to determine one or more optimized hyperparameters in a subset value of each of the one or more hyperparameters.

13. The ML-based system of claim 9, wherein in pre-processing the one or more documents, the document pre-processing subsystem is configured to extract data from the one or more electronic documents, using a document scraper model, wherein the extracted data comprise at least one of: one or more words, one or more phrases, one or more numbers, and one or more characters with metadata.

14. The ML-based system of claim 13, wherein in pre-processing the one or more documents, the document pre-processing subsystem is further configured to group the data based on at least one of: parts of speech of at least one of: the one or more words and the one or more phrases, relationship between at least one of: the one or more words and the one or more phrases, and meaning of at least one of: the one or more words and the one or more phrases, using one or more custom rules.

15. The ML-based system of claim 14, wherein in pre-processing the data associated with the one or more electronic documents, the document pre-processing subsystem is further configured to at least one of:

replace each character in the one or more contents with one or more corresponding Unicode string values, based on one or more custom noise removal rules;

remove one or more punctuations before the one or more phrases in the one or more contents, based on the one or more custom noise removal rules; and remove one or more characters that are recurred, from the one or more contents, based on the one or more custom noise removal rules.

16. The ML-based system of claim 9, further comprising an accuracy assessment subsystem configured to:

assess an accuracy of extracted one or more financial information by comparing the extracted one or more financial information with one or more reference financial information;

generate one or more evaluation reports providing one or more insights into the accuracy of the extracted one or more financial information;

automatically generate one or more feedback in at least one of: real-time and periodic, on the one or more evaluation reports to provide one or more suggestions on the extraction process; and monitor performance of the extraction process over time to determine one or more changes in accuracy metrics and error patterns.

17. A non-transitory computer-readable storage medium having instructions stored therein that when executed by one or more hardware processors, cause the one or more hardware processors to execute operations of:

obtaining the one or more documents from one or more data sources;

pre-processing the one or more documents to generate pre-processed data associated with one or more contents;

classifying the one or more contents as one or more potential key-value pairs corresponding to the one or more financial information based on one or more system prompts, using a machine learning (ML) model, wherein classifying the one or more contents as one or more potential key-value pairs corresponding to the one or more financial information based on one or more system prompts, using the ML model, comprises:

converting the pre-processed data into unstructured data having a single unstructured string based on at least one of lines, tabs, spaces within the one or more documents, to provide alignment information associated with the one or more documents to the ML model; and generating the one or more system prompts to classify the unstructured data as one or more potential key-value pairs using Natural Language Processing (NLP) techniques, wherein the generation of the one or more system prompts includes one of:

performing alignment of the one or more documents based on the unstructured data using the ML model being pre-trained on a plurality of documents, to mitigate one or more alignment errors from the one or more documents; and obtaining one or more localization information from one or more users, wherein the one or more system prompts utilize the one or more localization information for classifying the unstructured data as one or more potential key-value pairs;

extracting the one or more potential key-value pairs corresponding to the one or more financial information, using the ML model;

correcting the one or more potential key-value pairs to obtain one or more corrected key-value pairs corresponding to the one or more financial information based on one or more custom prompts, using the ML model; and providing the one or more corrected key-value pairs corresponding to the one or more financial information as an output, to one or more end users on one or more user interfaces associated with one or more electronic devices associated with the one or more end users.

* * * * *